United States Patent
Traverso

(10) Patent No.: US 7,956,170 B2
(45) Date of Patent: Jun. 7, 2011

(54) AROMATIC-ALIPHATIC AZO DERIVATIVES PARTICULARLY AS MARKERS FOR PETROLEUM PRODUCTS, METHOD FOR SYNTHESIZING THEM, USE THEREOF AND DERIVED COMPOSITIONS

(76) Inventor: Enrico Traverso, Monza (IT)

(*) Notice: Subject to any disclaimer, the term of this patent is extended or adjusted under 35 U.S.C. 154(b) by 765 days.

(21) Appl. No.: 11/791,843

(22) PCT Filed: Dec. 19, 2005

(86) PCT No.: PCT/EP2005/013661
§ 371 (c)(1), (2), (4) Date: May 30, 2007

(87) PCT Pub. No.: WO2006/069664
PCT Pub. Date: Jul. 6, 2006

(65) Prior Publication Data
US 2008/0015342 A1    Jan. 17, 2008

(30) Foreign Application Priority Data
Dec. 27, 2004 (IT) .............. MI2004A02519

(51) Int. Cl.
C09B 29/33 (2006.01)
C09B 67/22 (2006.01)
C10L 1/226 (2006.01)
C10M 171/00 (2006.01)
B01F 1/00 (2006.01)

(52) U.S. Cl. ........... 534/739; 534/DIG. 1; 534/DIG. 2; 44/328; 208/12; 252/364

(58) Field of Classification Search .............. None
See application file for complete search history.

(56) References Cited

U.S. PATENT DOCUMENTS

| 2,453,661 | A | * | 11/1948 | Glass et al. ............... 430/359 |
| 3,883,568 | A | | 5/1975 | Turner et al. |
| 4,058,608 | A | | 11/1977 | Zsolnai et al. |
| 5,100,760 | A | | 3/1992 | Sato et al. |
| 5,156,653 | A | | 10/1992 | Friswell et al. |
| 6,339,145 | B1 | | 1/2002 | Traverso |

FOREIGN PATENT DOCUMENTS

JP    2003-170662    *    6/2003

OTHER PUBLICATIONS

Machine translation of JP 2003-170662, Jun. 17, 2003.*

* cited by examiner

Primary Examiner — Fiona T Powers
(74) Attorney, Agent, or Firm — Modiano & Associati; Albert Josif; Daniel O'Byrne

(57) ABSTRACT

Products having the general formula A, particularly useful as non-coloring markers in a process for tagging mineral oils, petroleum derivatives in general and solvents. A method is also described for synthesizing the products by resorting to a classical diazocoupling reaction between a derivative of an aromatic amine and a coupling agent, preferably a functionalized ester. The invention also relates to the use of these tagging and dyeing molecules and mixtures which comprise them. In particular, the mixtures comprise the markers according to the invention and the markers and/or dyes classically used in the petroleum sector.

25 Claims, No Drawings

AROMATIC-ALIPHATIC AZO DERIVATIVES PARTICULARLY AS MARKERS FOR PETROLEUM PRODUCTS, METHOD FOR SYNTHESIZING THEM, USE THEREOF AND DERIVED COMPOSITIONS

The present invention relates to products which are particularly useful as non-coloring markers for mineral oils, petroleum derivatives in general and solvents, to a method for synthesizing them, to a method for tagging mineral oils, petroleum derivatives in general and solvents which uses said products, and to tagging and dyeing compositions which comprise them.

BACKGROUND OF THE INVENTION

Mineral oils very often receive the addition of commercial markers, either alone or mixed with dyes, in small quantities comprised generally from 10 ppm to 40 ppm, so as to characterize and diversify said oils, mainly for taxation reasons, depending on use. A same universal oil can in fact be subjected to different taxation rates when it is intended for different uses (e.g., automotive use, heating, industry). Use is therefore characterized by the presence or absence of dyes and/or markers. It is thus possible to contrast fraudulent uses by means of qualitative and quantitative testing of the dye and marker that is present in the oil. Generally, the presence of the marker is detected by extracting it with an acid or basic solution depending on the type of said marker. The extraction solution therefore assumes a specific color, so that the presence of the marker can be detected by means of a field test which can be performed even by a non-expert. Moreover, spectrophotometric analysis allows to determine precisely the type of marker by means of the wavelength of the absorption peak and the quantity of the marker by measuring the absorbance. In order to identify fraudulent blending, the minimum detectable concentration generally must be at least 10 times lower than the amount used. The best-known commercial markers include those disclosed in patents DE3627461 (in the name of BASF) and EP0509819 (in the name of MORTON).

DE3627461 discloses dyes with azoic aromatic para-amino structure, which can be extracted from the mineral oil to which they are added by means of an acid aqueous solution which assumes an intense red color. Among the molecules of DE3627461, the most successful one is C.I. (color index) Solvent Yellow 124 (known as Sudan Marker 455-BASF). The product, as well as the entire class of molecules to which it belongs, disclosed by DE3627461, is characterized in that it gives an intense yellow color (maximum of 412 nm in xylene) to the mineral oil to which it is added. However, this aspect is unwanted in many cases, since it entails for example altering the color of any blends of mineral oils which comprise the tagged oil.

EP0509818 discloses non-coloring markers having an azoic-phenolic structure, which do not color significantly the mineral oils to which they are added. The main representatives of the class disclosed in EP0509818 are Mortrace ST and Mortrace SB. The molecules of EP0509818 and the two Mortrace products, in particular, suffer the drawback of having a low spectrophotometric absorbance in the extractant (generally a ternary basic solution of water-amine-KOH), therefore requiring high doses in order to be detected.

SUMMARY OF THE INVENTION

The aim of the present invention is therefore to provide non-coloring markers, for example for mineral oils, which overcome the drawbacks of the background art.

Within this aim, an object of the invention is to provide a marker, for example for mineral oils, which does not give any specific coloring to the mineral oil to which it is added and has a high specific absorbance, so that it can be detected easily even at low concentrations.

Another object is to provide a marker as described above which can be mixed with conventional markers and/or dyes without causing interference in terms of absorption and color.

Another object is to provide a quick and low-cost method for synthesizing a marker as defined above.

This aim and these and other objects which will better appear hereinafter are achieved by a product, particularly as a marker for mineral oils, having the general formula A:

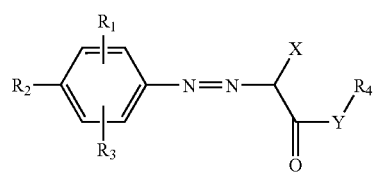

Formula A where:
- $R_1$, $R_2$ and $R_3$ are each independently selected from the group that consists of H, $CH_3$, $C_2H_5$, $OCH_3$, $OC_2H_5$, Cl, Br, F, $CCl_3$, $CF_3$, CN and $NO_2$, with the condition that at least one is selected among Cl, Br, F, $CCl_3$, $CF_3$, CN and $NO_2$, and preferably is $NO_2$;
- $R_4$ is a linear or branched hydrocarbon chain, which comprises at least 8 carbon atoms and optionally comprises at least one element selected among oxygen, $C_5$-$C_6$ aliphatic cyclic hydrocarbon, and $C_6$ aryl,
- X is selected from the group that consists of CN, formyl, acetyl, propionyl and butyryl;
- Y is selected from the group that consists of oxygen, sulfur, NH, $NR_4$ and $NR_5$, where $R_4$ is defined as above and $R_5$ is a $C_1$-$C_7$ linear or branched aliphatic hydrocarbon chain.

The aim and objects of the invention are also achieved by a composition which comprises at least one marker as defined above, in combination with one or more additives which are typical of the petroleum sector.

The aim and objects of the invention are also achieved by a method for tagging a medium which does not contain strong basic substances, which comprises the step of adding to said medium at least one product as defined above, as it is or in the form of a composition with one or more additives which are typical of the petroleum sector.

The aim and objects of the invention are also achieved by a method for preparing a marker as defined above, comprising the step of diazocoupling an aromatic diazo derivative having the formula (B):

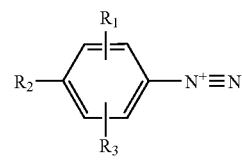

with a coupling agent having the formula (C):

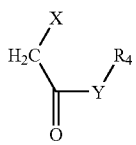

wherein the variables are defined as above.

DETAILED DESCRIPTION OF THE INVENTION

It is understood that any characteristic that is mentioned with reference to just one of the aspects of the invention but that can also be referred to other aspects should be considered equally valid with regard to said aspects, even though it is not repeated explicitly.

In a first aspect, the invention relates to products having the general formula A as defined above. In a preferred embodiment of the invention, the markers have the general formula A, where:
  $R_1$, $R_2$ and $R_3$ are each independently selected from the group that consists of H, $CH_3$, $OCH_3$, Cl, Br, F, $CF_3$, $CCl_3$, CN and $NO_2$, and at least one is $NO_2$;
  $R_4$ is a linear or branched aliphatic $C_{10}$-$C_{20}$ hydrocarbon chain, which optionally comprises one or more atoms of oxygen, and is preferably constituted by a mixture of various components which are isomeric or have a different molecular weight;
  X is selected from the group that consists of CN, acetyl, propionyl and butyryl;
  Y is oxygen.

Excellent results have been achieved by a product constituted by a mixture of homologous markers having the formula A, where $R_4$ is a branched alkyl primary radical, with an average number of carbon atoms comprised from 12 to 15.

The products according to the invention are generally inherently liquid or are rendered liquid by solubilization with suitable lipophilic solvents or mixtures of solvents.

In another aspect, the invention relates to a method for tagging a medium which does not contain strong basic substances, which comprises the step of adding to said medium at least one marker as defined above. More particularly, the method is adapted to tag a medium selected from the group which comprises mineral oils, petroleum distillates other than mineral oils, and solvents. Preferred media to which it is possible to add the markers according to the invention are:
  natural or synthetic lubricating oils;
  natural or synthetic waxes;
  aromatic solvents (e.g., toluene, xylene, aromatic naphthas, mixtures thereof);
  aliphatic solvents (e.g., hexane, heptane, isooctane, mixtures thereof);
  solvents other than the ones mentioned above, for example alcohols, ketones, esters, ethers, mixtures thereof;
  liquid and solid polymers;
  and mixtures thereof.

The media listed above do not contain strong basic substances and cannot be mixed with the extraction solutions, described hereinafter, used to extract the marker according to the invention.

It has been found surprisingly that the markers according to the invention, despite having an azoic structure, do not give any color to the medium to which they are added. Nonetheless, when the media provided with the additives are treated with an appropriate non-miscible and reactive extraction liquid, such liquid becomes colored, thus demonstrating the effectiveness of the marker. The intensity of the color in the extraction liquid is variable, substantially as a function of the concentration of the marker, but is in any case such as to allow to identify the marker at the concentrations at which conventional dyes are used.

In a particular embodiment, the tagging method comprises an additional step of extracting the marker from the medium to which it has been added.

In the case of solid media, such as solid polymers, marker extraction occurs by first powdering the medium, by means of an extraction treatment and a subsequent filtration.

The markers according to the invention can be extracted from the oils or other media to which they are added with a basic solution, and are characterized by a high specific absorbance in the extractant, and do not give any color to the marked medium.

If the medium to be marked is a mineral oil, the amount of marker to be added which is sufficient to achieve the aim and objects of the invention is generally from 1 to 50 mg/l of medium, preferably from 5 to 20 mg/l, more preferably equal to 10 mg/l.

The specific absorbance of the products according to the invention varies from 200 to 1000, typically 700.

The extraction solution must at least comprise a strong base. In a preferred embodiment, the extraction solution comprises three components:
  a strong inorganic base, preferably a metallic hydroxide, more preferably one among NaOH, KOH, LiOH, and mixtures thereof, in a quantity comprised from 0.1 to 1% by weight;
  water, in an amount comprised from 30 to 60% by weight;
  at least one water-soluble amine, chosen among primary amines, secondary amines, tertiary amines, preferably at least one among 3-methoxy-propylamine, 2-methoxyethylamine, 2-ethoxyethylamine, morpholine, piperazine, diethanolamine, diisopropanolamine, ethyl-ethanolamine, isopropyl ethanolamine, in a total amount comprised from 40 to 70% by weight.

Optionally, the extraction solution can comprise a fourth water-soluble component, as a partial replacement of the water and amine, wherein said optional ingredient is selected from methanol, ethanol, isopropanol, ethylene glycol, propylene glycol, polyethylene glycol, dimethyl sulfoxide, dimethyl formamide, N-methyl-2-pyrrolidinone, and mixtures thereof.

In the exemplifying case in which the medium to be tagged is a mineral oil, the volume ratio between the extraction solution and the mineral oil from which the marker is to be extracted is variable and decreases as the amount of marker in the oil decreases. In general, this ratio varies from 2:1 to 1:10, where the volume ratio is advantageously equal to 1 when the amount of marker for one liter of mineral oil is comprised from 5 to 20 mg/l and is advantageously 0.2 when the amount of marker for one liter of mineral oil is comprised from 1 to 2 mg/l, so that small amounts of marker can be concentrated in smaller quantities of extractant. The value of the ratio can also be lower than 0.2 when quantities of marker below 0.5 mg/l are to be detected.

In another aspect, the invention relates to a composition which comprises at least one marker product as defined above, in combination with one or more additives of the petroleum sector, such as preferably tagging and/or dyeing products conventionally used to identify mineral oils, petroleum distillates other than mineral oils, and solvents.

A part of the markers according to the invention are liquids, though with high viscosity, and if needed they can be diluted with ordinary solvents used in the sector, so as to make them more fluid. Another part of the markers is solid and, if needed, can be dissolved. The markers are highly soluble and therefore a person skilled in the art can easily prepare a solution at the most preferred concentration, for example in such a manner that the solutions are stable even at low temperature.

Suitable solvents for diluting or solubilizing the markers are selected from the group which comprises xylene, mesethylene, aromatic naphthas, for example Shellsol AB and Solvesso 150 (i.e., mixtures of $C_{10}$-$C_{11}$ aromatic hydrocarbons), alkyl naphthalenes, alkyl phenols, for example p-nonyl and p-dodecyl phenol, N-methyl-2-pyrrolidinone, and mixtures thereof.

In addition to the lack of color, an additional advantage of the markers according to the invention is that if needed they can be used together with the dyes which are typical of the sector and together with the marker C.I. Solvent Yellow 124 disclosed in DE3627461. Both the dyes and said marker in fact are not extracted by a basic solution, and therefore the extraction of the marker according to the invention can be performed without risk of interference.

In another aspect, the invention relates to the synthesis of the markers described above.

The aromatic diazonium salt and the coupling agent can be provided separately according to conventional methods and then joined.

In a preferred embodiment, the method therefore comprises the steps of:
a) preparing a coupling agent having the formula (C) starting from a methyl ester having the formula X—$CH_2$—$COCH_3$ and a compound having the formula $R_4$—YH, where $R_4$ is defined as above;
b) preparing the diazo derivative having the formula (B) of the aromatic primary amine having the formula:

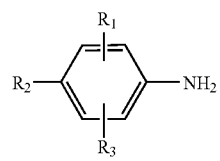

where $R_1$, $R_2$ and $R_3$ are defined as above;
c) diazocoupling the diazo of the aromatic amine having the formula (B) prepared in step b) with the coupling agent (C) prepared in step a), where said diazo coupling step occurs in the conditions typically used when the coupling agent is a weak coupling agent;
d) isolating the required product (also known as product finishing).

High preference is given to the case in which the compound having the formula $R_4$—YH used in step a) is a mixture of homologous compounds having the formula $R_4$—YH, where $R_4$ is a branched alkyl primary radical with an average number of carbon atoms comprised from 12 to 15.

In the preferred case in which Y is an oxygen atom, the method comprises the steps of:
a) preparing an ester coupling by transesterification between the methyl ester having the formula X—$CH_2$—$COCH_3$ with a single primary alcohol having the formula $R_4$—OH, where $R_4$ is defined as above or, more preferably, with a mixture of homologous primary alcohols having the formula $R_4$—OH, where $R_4$ is a branched alkyl primary radical with an average number of carbon atoms comprised from $C_{12}$ to $C_{15}$;
b) preparing by diazotization the diazo derivative of the aromatic primary amine having the formula:

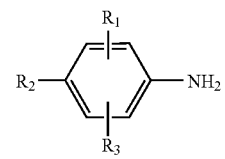

c) diazocoupling the diazo of the aromatic amine prepared in step b) with the coupling ester prepared in step a), wherein said coupling step occurs in the conditions typically used when the coupling agent is a weak coupling agent;
d) isolating the chosen product.

The experimental conditions of step a) can be determined easily by a person skilled in the art according to ordinary knowledge of the field. The best results have been achieved when the reaction temperature is comprised from 125 to 170° C., preferably in the presence of a catalyst selected among organic derivatives of tin or titanium, said catalyst being present in a quantity from 30 to 200 ppm of metal with respect to the methyl ester. The methyl group that is initially present is converted into methanol, which can then be eliminated in azeotropic form in a mixture with toluene.

Diazotization also is performed by following classical methods, for example in water, by reaction with nitrous acid at 0° C.

Conditions typically adopted in step c) are toluene solvent, in a heterogeneous mixture, in an environment which is buffered to a pH from 4 to 5 and at a temperature from 5 to 10° C.

In one embodiment, the step of isolating the sought product comprises separating the organic reaction phase which contains the prepared marker from the aqueous phase, washing the separated organic phase, drying and removing the solvent by distillation in vacuum of the solvent (toluene), which can be recovered and recycled. Before using them as markers, the dry products that can be obtained with the method according to the invention are generally diluted, as mentioned above, with commonly used solvents. For example, it is possible to prepare a solution at a concentration of 600 g/mole with Solvesso 150 aromatic solvent.

A list of preferred synthesized markers and the reference to the corresponding example in which they are described is given below:

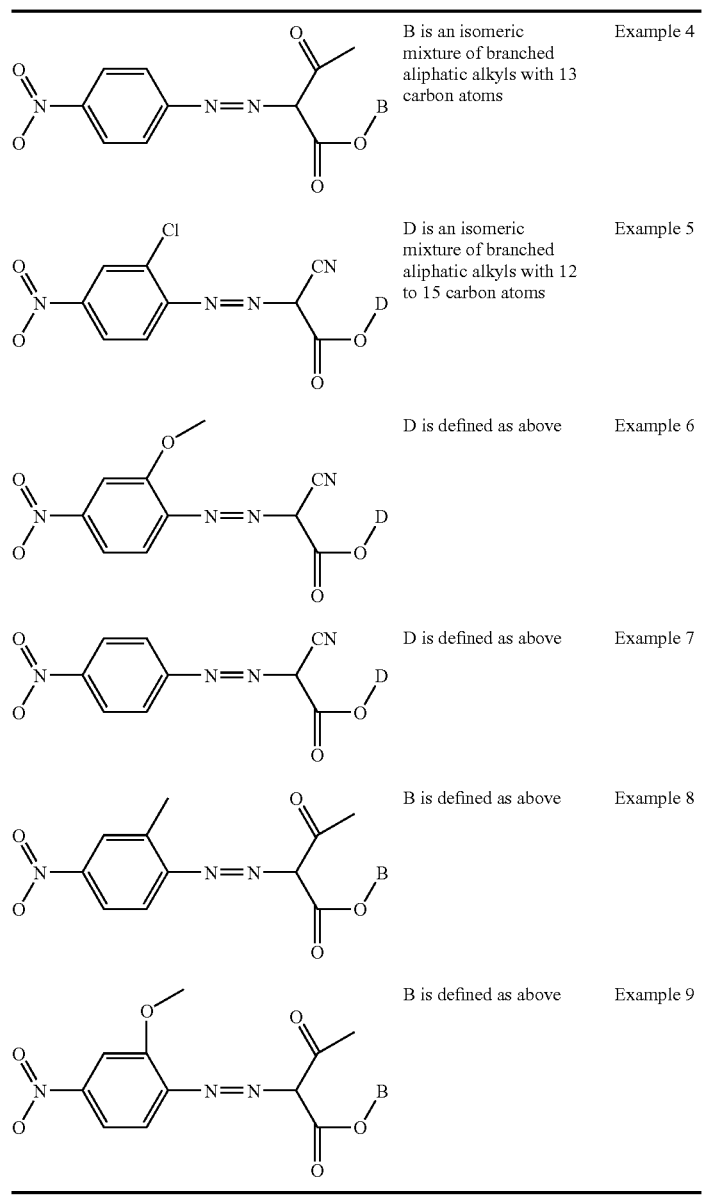

Other characteristics and advantages of the present invention will become better apparent from the description of the following preferred embodiments, given merely by way of non-limiting examples.

Likewise, although the examples that follow and the text explicitly illustrate only some preferred embodiments of the invention, the person skilled in the art will understand immediately that it is possible to provide numerous modifications without thereby losing the advantages of the invention.

Examples 1-9 that follow describe the preparation of markers according to the invention. Example 10 also describes the preparation of the MORTRACE SB marker disclosed in EP0509818, in order to highlight its difference in absorbance with respect to the marker of the invention of Example 4. In order to make the comparison as clear as possible, the same aromatic amine for diazotization (4-nitroaniline) was used in both compounds and the same extraction solution was used to reveal it. All of Examples 1-10 use the same extraction mixture, termed Extractant F and comprising 3-methoxy-propyl-amine at 65% by weight and a 1% solution of KOH in water at 35% by weight. Examples of uses of the marker of Example 4 in diesel fuels and gasolines are also given.

EXAMPLE 1

Preparation of acetyl acetate of EXXAL13.

A fully equipped four-necked flask (thermometer, electro-mechanical agitator), provided with a thermally-insulated Vigré distillation column with a height of 30 cm and a reflux head, mounted on a temperature-controlled diathermic oil bath, is loaded with:
- 175 g of methyl acetyl acetate, 1.5 moles,
- 308 g of mixture of branched primary tridecyl alcohols (EXXAL13, Esso product)—MW 195-1.58 moles,
- 1.5 g of 10% toluene solution by weight of dibutyl tin dilaurate,
- 120 ml of toluene.

Heating is performed. In the course of 5 hours, 69 g of methanol-toluene azeotrope (64-66° C.; methanol 70-73%)

are distilled and separated at the head of the column. The reaction temperature varies gradually from 125 to 166° C. The reaction mixture is agitated vigorously. At the end, at a temperature of 166° C., another 10 ml of toluene are distilled (temperature at the head of the column, 70-110° C.).

The reaction product, a clear liquid with a slightly straw-yellow color (509 g, approximately 81% acetyl acetate of EXXAL 13 by weight, methyl acetyl acetate <1% by weight) is used as such in the subsequent coupling reactions.

EXAMPLE 2

Preparation of acetyl acetate of ISALCHEM 125.

The same apparatus is used and the same operating methods of Example 1 are used. The following are loaded into the reaction flask 175 g of methyl acetyl acetate, 1.5 moles,
330 g of mixture of branched primary $C_{12}$-$C_{15}$ alcohols (ISALCHEM 125, product of CHIMICA AUGUSTA), average MW 206, 1.6 moles,
1.5 g of 10% toluene solution by weight of dibutyl tin dilaurate,
120 ml of toluene The final reaction product, a clear straw-yellow liquid (530 g; acetyl acetate of ISALCHEM 125, 81-82% by weight) is used as such in the coupling reactions.

EXAMPLE 3

Preparation of cyanoacetate of ISALCHEM 125.

The same apparatus and the same operating methods of Example 1 are used. The following are loaded into the reaction flask:

149 g of methyl cyanoacetate, 1.5 moles,
330 g of ISALCHEM 125, 1.6 moles,
1.5 g of 10% toluene solution of dibutyl tin dilaurate,
120 ml of toluene.

The final reaction liquid (502 g; 81-82% by weight cyanoacetate of ISALCHEM 125) is used as such in the coupling reactions.

EXAMPLE 4

Preparation of the product for coupling between the diazo of 4-nitroaniline and acetyl acetate of EXXAL 13.

In a 500-ml three-necked flask provided with a mechanical agitator and a thermometer, the following are loaded:

28.2 g of 98% by weight 4-nitroaniline, approximately 0.2 moles;
50 ml of water;
60 ml of HCl 10N. Mixing, with agitation, is exothermic. Heating is performed up to 60° C. The aniline solubilizes completely. The mixture is allowed to cool to 30° C. and then the following are loaded:
170 g of ice in granules. Agitation is vigorous.
The aniline hydrochloride precipitates in dispersed form.
A bath with ice, salt and some water is placed under the flask. Then the following are loaded all at once:
14.4 g of $NaNO_2$ in crystals. The mixture is kept under agitation for 50 minutes at −2° C. A small amount of sulfamic acid is added in order to destroy the excess nitrous acid. The diazotization solution is clarified by filtration in order to eliminate a small quantity of dark insoluble product. The filtered solution (approximately 350 ml) is loaded over 10 minutes into a 4-necked 1-liter flask, provided with normal equipment, placed on a water-ice bath and containing:

70 g of 81% by weight acetyl acetate of EXXAL 13, prepared in Example 1, 0.206 moles;
180 ml of toluene;
60 ml of n-propanol;
200 ml of water;
60 g of sodium acetate;
40 g of ice.

The reaction mixture is kept under agitation at 8° C. for 3 hours. At the end, the diazo compound is absent. The pH is 4.3-4.5. The volume is approximately 900 ml. The aqueous phase, which separates rapidly by stratification, is eliminated by siphoning.

The organic phase is washed with two portions of 300-ml demineralized water.

The residual toluene solution is anhydrided and dried by heating in vacuum (initial temperature 60° C., up to 125° C.; pressure from 200 mm Hg down to 30 mm Hg).

The residue, 90.5 g, is diluted to standard to 120 g (the expression "to standard" is understood as meaning to a standard weight of 120 g) with Solvesso 150 aromatic solvent with a high boiling point (m.p. 61° C.). This final solution is a very fluid liquid, which is indefinitely stable at low temperatures (−20° C.).

A solution in heptane at 9.85 mg/l of the product diluted to standard is prepared. The solution in heptane (9.85 mg/l) is practically colorless. It has a single absorption peak in the UV region, at the border of the visible region, with an absorbance of 0.432 at 369 nm and a specific absorbance (1 g/100 ml) of 438. The solution in heptane of 9.85 mg/l of the product diluted to standard is subjected to extraction with an equal volume of extractant F. The extraction solution assumes a red color. Its absorbance is 0.6974 at 520 nm. This leads to a specific absorbance of the product diluted to standard (absorbance referred to a solution of 1 g of product in 100 ml of extractant in a cell with a side of 1 cm) equal to 708. The concentrated product obtained at the end of the elimination of the solvent was a viscous liquid which however flowed perfectly even at low temperature. Its specific absorbance in the extractant F was equal to 940 at 520 nm.

EXAMPLE 5

Preparation of the product of coupling between diazo of 2-Cl-4-nitroaniline and cyanoacetate of ISALCHEM 125.

The following are loaded into a three-necked, 500-ml flask:
35.5 g of 2-chloro-4-nitroaniline,
60 ml of water,
0.1 g of NORAMIUM S-50 (benzyl-dimethyl-alkyl-ammonium chloride in a solution of isopropanol, a product of CECA-ATOCHEM)
60 ml of HCl 10N. Agitation is performed for 1 hour. A finely divided homogeneous suspension is formed. The flask is then immersed in a bath of ice-water-salt.

The following are added:
150 g of ice, and then, below the surface and all at once,
72 ml of solution at 20% w/v of sodium nitrite.

Agitation is performed for 1 hour at −2° C. A small amount of sulfamic acid is added, agitation is maintained for another 15 minutes, and then the solution of diazonium salt is clarified in order to eliminate floccules of suspended material.

The coupling reaction is then performed by using as a coupling agent 68 g of ISALCHEM 125 cyanoacetate at 81% by weight, as obtained in Example 3.

The coupling reaction and finishing are performed as described in Example 4.

The result is 95.5 g of dry product, a viscous liquid which is diluted to standard to 120 g with Solvesso 150 aromatic solvent.

The standardized product, solubilized in heptane (10 mg/l) and extracted with an equal volume of extractant F, has a specific absorbance of 203 at 497 nm.

EXAMPLE 6

Preparation of the product for coupling between diazo of 2-methoxy-4-nitroaniline and cyanoacetate of ISALCHEM 125.

Diazotization of 2-methoxy-4-nitroaniline is performed as described in Example 5 for 2-chloro-4-nitroaniline, with the difference that the coupling reaction requires 12 hours for its completion.

The following are used:
34 g of 2-methoxy-4-nitroaniline
68 g of cyanoacetate of ISALCHEM 125 at 81% by weight, as obtained in Example 3.

The result is 94 g of dry product, a viscous liquid which is diluted to standard to 120 g with Solvesso 150 aromatic solvent.

The product diluted to standard, solubilized in heptane (10 mg/l) and extracted with an equal volume of extractant F, has a specific absorbance of 485 at 503 nm.

EXAMPLE 7

Preparation of the product of coupling between diazo of 4-nitroaniline and cyanoacetate of ISALCHEM 125.

Diazotization, coupling and finishing are performed as described in Example 4.

The following are used:
28.2 g of 4-nitroaniline,
68 g of 81% cyanoacetate of ISALCHEM 125, as obtained in Example 3.

The result is 91 g of dry product, a viscous liquid which is diluted to standard to 120 g with Solvesso 150. The product diluted to standard, solubilized in heptane (10 mg/l) and extracted with an equal volume of extractant F, has a specific absorbance of 270 at 484 nm.

EXAMPLE 8

Preparation of the product of coupling between diazo of 2-methyl-4-nitroaniline and acetyl acetate of EXXAL 13.

Diazotization, coupling and finishing are performed as described in Example 4.

The following are used:
31 g of 2-methyl-4-nitroaniline,
70 g of 81% by weight EXXAL 13 acetyl acetate, as prepared in Example 1.

The result is 92 g of dry product, a viscous liquid which is diluted to standard to 120 g with Solvesso 150.

The product diluted to standard, solubilized in heptane (10 mg/l) and extracted with an equal volume of extractant F, has a specific absorbance of 720 at 539 nm.

EXAMPLE 9

Preparation of the product of coupling between diazo of 2-methoxy-4-nitroaniline and acetyl acetate of EXXAL 13.

Diazotization of 2-methoxy-4-nitroaniline is performed as described in Example 5 for 2-chloro-4-nitroaniline, coupling and finishing are performed as described in Example 4, with the difference that the coupling reaction requires 12 hours at 8° C. and one night at approximately 20° C. for its completion.

The following are used:
34 g of 2-methoxy-4-nitroaniline,
70 g of EXXAL 13 acetyl acetate, as obtained in Example 1.

The result is 93 g of dry product, a viscous liquid when hot, which is diluted to standard to 120 g with Solvesso 150.

The product diluted to standard, solubilized in heptane (10 mg/l) and extracted with an equal volume of extractant F, has a specific absorbance of 731 at 546 nm.

The product diluted to standard (120 g) is not stable: it solidifies after 1 day. Therefore it is diluted to 220 g with Solvesso 150. The new solution is stable even at low temperature.

EXAMPLE 10

Comparison

Preparation of the product of coupling between diazo of 4-nitroaniline and 2,6-di-sec-butylphenol. The formula is as follows:

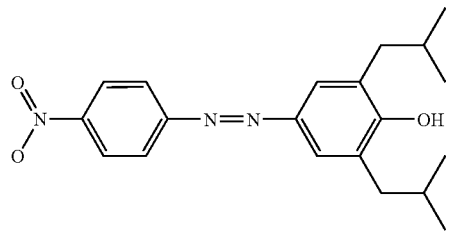

The product is MORTRACE SB, disclosed in EP0509818, and is used here as comparison with the product obtained in Example 4.

0.2 moles of the diazo of 4-nitroaniline in solution are prepared as described in Example 4. The filtered solution of the diazo (350 ml) is loaded over 10 minutes into a four-necked 1-liter flask, mounted over a bath of water-ice and containing:
43 g of di-sec-butylphenol, with a prevalence of isomer 2,6;
180 ml of toluene;
200 ml of water;
60 g of sodium acetate;
50 g of ice.

The reaction mixture is kept under agitation at 5° C. for 3 hours until the diazo derivative disappears.

The aqueous phase is separated and eliminated from the organic phase, which is then washed, dehydrated and dried in vacuum as described in Example 4. The result is 72 g of dry product, a viscous liquid which is diluted to standard to 120 g with Solvesso 150.

The product diluted to standard, solubilized in heptane (10 mg/l) and extracted with an equal volume of extractant F, has a specific absorbance of 230 at 596 nm.

The specific absorbance of the dry product is 383 (230× 120/72). Therefore, regardless of the different absorption wavelength, the ratio between its molar absorbance and the absorbance of the dry product of Example 4 is 383/940=0.4. The products according to the invention, therefore, can be used as markers at significantly lower concentrations than the non-coloring markers of EP0509818.

EXAMPLE 11

Diesel fuel for heating, colored red with 40 mg/kg of 55% solution in aromatic naphtha of C.I. Solvent Red 161, receives the addition of the marker diluted to standard of Example 4, in an amount of 10 mg/l.

1 volume of tagged diesel fuel is treated with 1 volume of extractant F, which assumes a red color and has an absorbance of 0.785, with a clearly defined peak at 520 nm. From this absorbance value it is necessary to subtract the value of 0.07 caused by the weak presence of different colored products which originate from the diesel fuel. The C.I. Solvent Red 161 dye, which has a single absorption peak at 490 nm in diesel fuel, is not present in the extractant, not even in minimal amounts.

EXAMPLE 12

Diesel fuel for farming use, dyed green and marked with 160 mg/kg of C.I. Solvent Green 33 anthraquinone dye at 80% by weight, with 14.4 mg/kg of marker C.I. Solvent Yellow 124 at 65% by weight (European marker SUDAN Marker 455-BASF) and with 30 mg/kg of 2-ethyl-anthraquinone, receives the addition of the marker diluted to standard of Example 4 at a dose of 2 mg/l.

5 volumes of diesel fuel thus dyed and tagged are treated with 1 volume of extractant F, which acquires a red color and has a clearly defined peak at 518 nm with an absorbance of 0.910. It is necessary to subtract from this absorbance value the value of 0.175 due to the weak presence of different dyed products which originate from the diesel fuel. The C.I. Solvent Green 33 dye, which has two absorption peaks in diesel fuel, at 645 nm and 604 nm, and the C.I. Solvent Yellow 124 marker, which has a peak at 410 nm, are extracted in small amounts in the extractant F. Their presence in any case does not affect the value of the absorbance of the marker of Example 4, also because it relates to a peak which is located on a different wavelength (518 nm) with respect to the ones mentioned above.

It is possible to fully eliminate the presence of the unwanted peaks from the absorption spectrum of the marker in the extractant. If so, it is necessary to measure the absorbance by using as white the non-tagged extractant F after its treatment (1 volume) with the same type of diesel fuel (5 volumes). The spectrum contains only the clean peak of the marker at 520 nm, with an absorbance of 0.72.

EXAMPLE 13

9 volumes of gasoline for automotive use, colored green with 36 mg/kg of 35% C.I. Solvent Blue 79 anthraquinone blue dye and with 4 mg/kg of 80% by weight C.I. Solvent Yellow 174 azoic dye, are mixed with 1 volume of heptane tagged with 10 mg/l of marker diluted to standard of Example 4.

5 volumes of the resulting mixture, which contains 1 mg/l of the marker, are treated with 1 volume of extractant F, which acquires a red color. The absorption spectrum is generated by using as white the extractant F after its treatment (1 volume) with the same non-tagged dyed gasoline (5 volumes). The resulting spectrum has a single distinct peak at 520 nm, with an absorbance equal to 0.360.

Although only some preferred embodiments of the invention have been described in the text, the person skilled in the art will understand immediately that it is possible in any case to obtain other equally advantageous and preferred embodiments.

The disclosures in Italian Patent Application No. MI2004A002519 from which this application claims priority are incorporated herein by reference

What is claimed is:

1. A product, of the formula A:

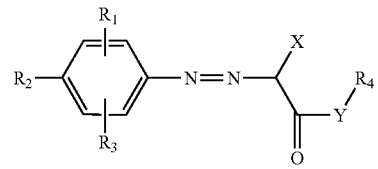

where:
  $R_1$, $R_2$ and $R_3$ are each independently selected from the group consisting of H, $CH_3$, $OCH_3$, Cl, Br, F, $CF_3$, $CCl_3$, CN and $NO_2$, and at least one is $NO_2$;
  $R_4$ is a linear or branched aliphatic $C_{10}$-$C_{20}$ hydrocarbon chain, optionally comprising one or more oxygen atoms;
  X is selected from the group consisting of CN, acetyl, propionyl and butyryl;
  Y is oxygen.

2. A product constituted by a mixture of homologous markers having the formula A according to claim 1, where $R_4$ is a branched alkyl primary radical with an average number of carbon atoms from 12 to 15.

3. A mixture of isomers of a compound of formula A according to claim 1, selected from the group consisting of

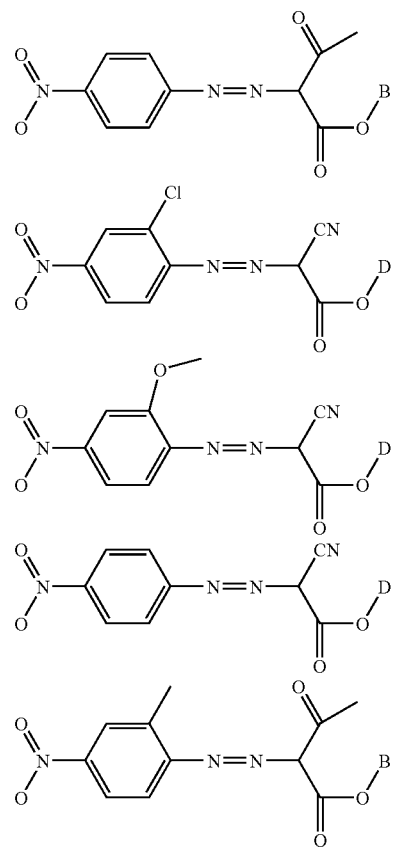

-continued

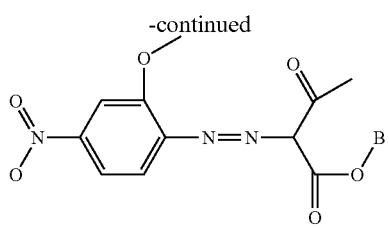

where 13 is an isomeric mixture of branched aliphatic alkyls with 13 carbon atoms and D is an isomeric mixture of branched aliphatic alkyls with 12 to 15 carbon atoms.

4. A composition comprising at least one marker product according to claim 1, in combination with one or more additives which are typical of the petroleum sector.

5. The composition according to claim 4, wherein the additive is one or more among markers and/or dyes conventionally used to identify mineral oils, petroleum distillates other than mineral oils, and solvents.

6. The composition according to claim 4, wherein the additive is C.I. Solvent Yellow 124.

7. The composition according to claim 4, further comprising a solvent selected from the group consisting of xylene, mesethylene, aromatic naphthas, alkylnaphthalenes, alkylphenols, N-methyl-2-pyrrolidinone, and mixtures thereof.

8. A method for tagging a medium which does not contain strong basic substances, comprising the step of adding to said medium at least one product according to claim 1, optionally in combination with one or more additives which are typical of the petroleum sector.

9. The method according to claim 8, wherein the medium to be tagged is selected from the group consisting of mineral oils, petroleum distillates other than mineral oils, and solvents.

10. The method according to claim 9, wherein the medium to be tagged is selected from the group consisting of:
natural or synthetic lubricating oils;
natural or synthetic waxes;
solvents;
aliphatic solvents;
solvents other than the ones mentioned above;
liquid and solid polymers;
and mixtures thereof.

11. The method according to claim 9, wherein the medium to be tagged is a mineral oil and the amount of marker which is added is comprised from 1 to 50 mg/l of oil.

12. The method according to claim 8, further comprising a step of extracting the product from the medium to which it had been added previously.

13. The method according to claim 12, wherein the step of extraction comprises the step of placing in contact the medium to which the marker product has been added with an extraction solution which comprises a strong base.

14. The method according to claim 13, wherein the extraction solution comprises:
a strong inorganic base, in a quantity comprised between 0.1 and 1% by weight;
water, in an amount comprised between 30 and 60% by weight;
at least one water-soluble amine, selected from the group consisting of primary amines, secondary amines, and tertiary amines.

15. The method according to claim 14, wherein the at least one water-soluble amine is selected from the group consisting of 3-methoxy-propylamine, 2-methoxyethylamine, 2-ethoxyethylamine, morpholine, piperazine, diethanolamine, diisopropanolamine, ethyl ethanolamine, isopropylethanolamine, and mixtures thereof; in a total amount from 40 to 70% by weight.

16. The method according to claim 13, wherein the extraction solution further comprises a fourth water-soluble component, as a partial replacement of the water and amine, selected from the group consisting of methanol, ethanol, isopropanol, ethylene glycol, propylene glycol, polyethylene glycol, dimethylsulfoxide, dimethylformamide, N-methyl-2-pyrrolidinone, and mixtures thereof.

17. The method according to claim 13, wherein the tagged medium is a mineral oil and the volume ratio between the extraction solution and the mineral oil from which the marker is to be extracted is comprised from 2:1 to 1:10.

18. The method according to claim 17, wherein the volume ratio is:
equal to 1, if the amount of marker for 1 liter of mineral oil is comprised between 5 and 20 mg/1;
0.2, if the amount of marker for 1 liter of mineral oil is comprised from 1 to 2 mg/1;
lower than 0.2, if the amount of marker for 1 liter of mineral oil is lower than 0.5 mg/l.

19. The method according to claim 12, wherein the medium is solid and the extraction step is preceded by a step for powdering the medium and is followed by a step for filtering the extraction solution.

20. A method for preparing a product according to claim 1, comprising the step of diazocoupling an aromatic diazo derivative of the formula (B):

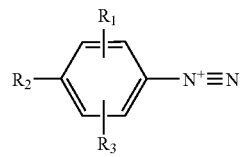

with a coupling agent of the formula (C)

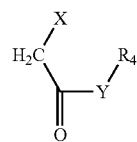

wherein the variables are defined according to claim 1.

21. The method according to claim 20, comprising the steps of:
a) preparing a coupling agent of the formula (C) starting from a methyl ester having the formula $X$—$CH_2$—$COCH_3$ and a compound having the formula $R_4$—YH, where $R_4$ is defined as above;
b) preparing the diazo derivative of the formula (B) of the aromatic primary amine having the formula:

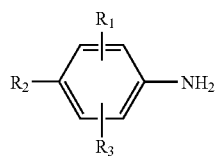

where $R_1$, $R_2$ and $R_3$ are defined as above;

c) diazocoupling the diazo of the aromatic amine having the formula (B) prepared in step b) with the coupling agent (C) prepared in step a), wherein said diazocoupling step occurs in the conditions typically used when the coupling agent is a weak coupling agent;

d) isolating the required product.

22. The method according to claim 21, wherein the compound having of the formula $R_4$—YH used in step a) is a mixture of homologous compounds of the formula $R_4$—YH, where $R_4$ is a branched alkyl primary radical, with an average number of carbon atoms from 12 to 15.

23. The method according to claim 21, wherein the compound of the formula $R_4$—YH is a primary alcohol.

24. The method according to claim 21, wherein step a) occurs at a temperature from 125 to 170 PC, in the presence of a catalyst selected from the group consisting of organic derivatives of tin or titanium, said catalyst being present in a quantity from 30 to 200 ppm of metal with respect to the methyl ester of the formula X—$CH_2$—$COCH_3$.

25. The method according to claim 21, wherein step c) occurs in toluene solvent, in a heterogeneous mixture, in an environment buffered to a pH from 4 to 5 and at a temperature from 5 to 10° C.

* * * * *